July 21, 1964     M. A. FRANK, SR     3,141,366
TOOL HOLDER AND MOUNT
Filed March 12, 1962
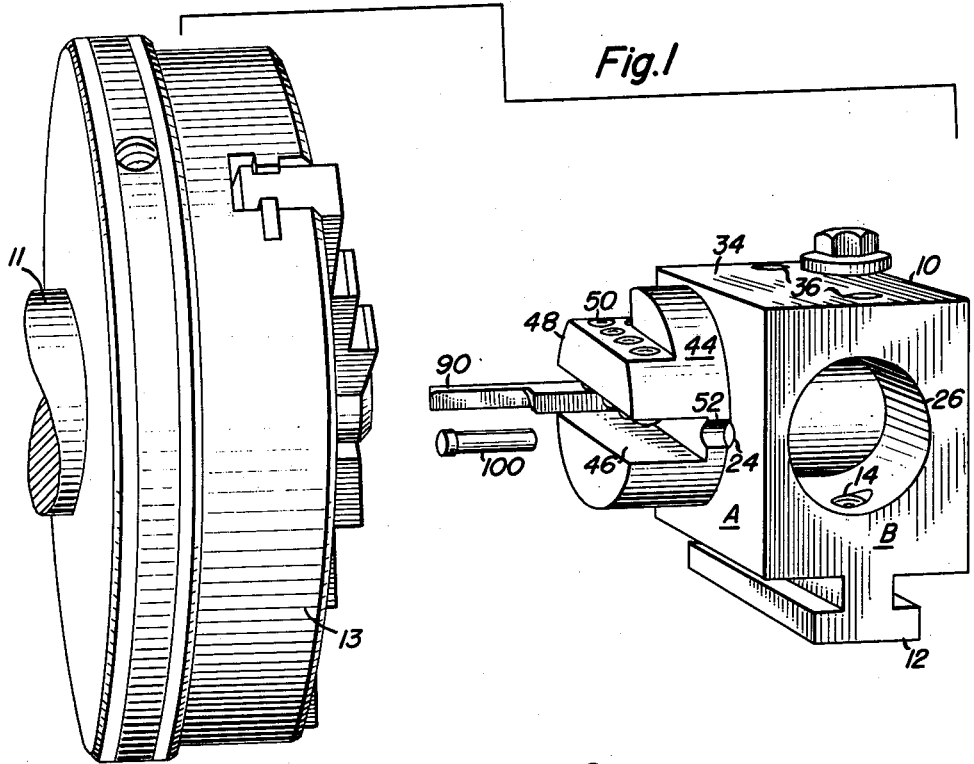
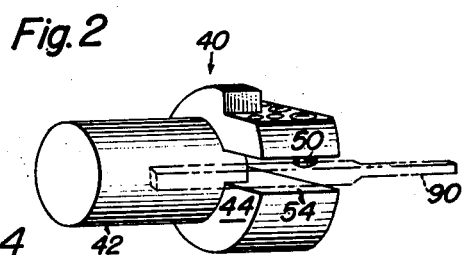
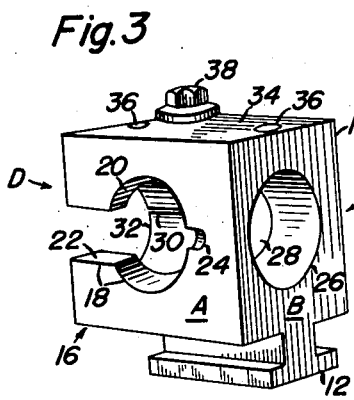 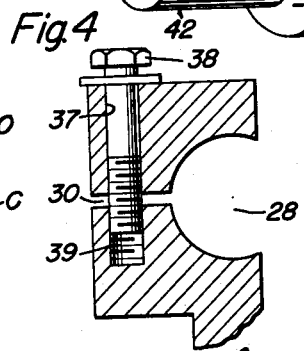
INVENTOR
Milton A. Frank Sr.
BY George Renehan
ATTORNEY United States Patent Office 3,141,366
Patented July 21, 1964

3,141,366
TOOL HOLDER AND MOUNT
Milton A. Frank, Sr., Frederick, Md., assignor to the United States of America as represented by the Secretary of the Army
Filed Mar. 12, 1962, Ser. No. 179,259
1 Claim. (Cl. 82—36)
(Granted under Title 35, U.S. Code (1952), sec. 266)

The invention described herein may be manufactured and used by or for the Government of the United States of America for governmental purposes without the payment to me of any royalty thereon.

This invention relates to a new and useful tool mount and a tool holder and tool mount combination.

The significant novelty of this particular combination is that the tool mount is mounted and bored so that the axis of a cylindrical tool holder intersects the dead center line through the spindle and tail stock, and the plane formed by these lines is parallel to the lathe bed. This combination provides the following advantages over the prior art devices:

(1) Minimizes chatter of the bit due to stress bending.
(2) Enables the tool to work close to the jaws of the chuck since the tool holder does not get in the way.
(3) Allows parting to be done without risk of tool breakage when galling occurs.
(4) Greatly reduces the set up time.

Those skilled in the art fully realize that the working position of a bit must be level with the dead center of the work. Much time is consumed adjusting prior art tools to the correct position. I have designed a tool holder that instantly and automatically sets the bit on or very close to its final working position so that final adjustment of the bearing edge of the bit can be made in a few seconds. Since bits are frequently changed for sharpening or used for other types of work on a piece, my tool device can save much time in shop operations. In addition, the tool mount itself is much more versatile than prior art tool posts in that drilling, tapping, forming, milling, grinding, and turning operations can be accomplished with it.

In order to more clearly disclose the construction, operation and use of the invention, reference should be had to the accompanying drawing forming part of the present application.

In the drawing,

FIG. 1 discloses the combination tool mount and tool holder with a tool held in relation with the work holder and spindle.

FIG. 2 shows the tool holder holding a tool.

FIG. 3 shows the tool mount;

FIG. 4 is a fragmentary sectional view showing the slit in the block and the means for tightening same.

My invention is designed for use on a lathe (not shown) which includes a spindle 11 carrying a work holder 13.

The tool mount 10 comprises a slidable T-shaped connector 12 for engagement with the carriage (not shown), allen screw means 14 for locking mount on carriage, and substantially square hollowed out block 16 having four sides and a top and being integrally connected with the connector 12.

The sides A, B, C and D will now be explained. In side A there is provided a key hole shape opening 18 which comprises a hole 20 centered on side A and a slot 22 which extends horizontally toward side D from hole 20 to the end of side A. A positioning groove 24 is located adjacent the hole 20 at a point along the horizontal center line of hole 20 and on the opposite side of hole 20 from the slot 22. A hole 26 is positioned in the center of side B. A hole 28 is positioned in the center of side C. In addition, a horizontal slit 30 extends from hole 28 toward side D to the end of side C. In side D there is provided a key hole shaped opening similar to that of side A wherein hole 32 is positioned in the center of side D and has slot 22 extending horizontally from hole 32 toward side A. Slit 30 also extends horizontally from hole 32 to the end of side D toward side C. The holes in sides A, B, C, and D are large enough in diameter to hold tool holder, boring, turning, milling and grinding devices. The holes 20, 28 in sides A and C are in substantially the same horizontal plane as and at right angles to the holes 26, 32 in sides B and D. The top 34 of the tool mount contains two screw holes 36 for attaching special tools such as stops and tracer duplicating tools. A hole 37 extends from the top 34 near the corner where sides C and D meet, downwardly and past the horizontal slit 30. The portion of the hole 37 below the slit 30 is threaded as at 39. A threaded screw and washer means 38 is then used in conjunction with the hole 37 and the slit 30 to tighten the various pieces of equipment in the holes provided by the block 16. It is easily seen therefore that the tool mount is constructed so as to lend itself to many types of machine operations. It can hold tools for boring, turning, milling and grinding. One of the major uses for the tool mount is the holding of a tool holder designed especially for this tool mount.

The tool mount 10 is mounted and bored so that the axis of the tool holder 40 intersects the dead center line through the spindle 11.

Referring now to FIGS. 1 and 2, the tool holder 40 comprises an elongated cylindrical member 42 which is integrally connected at one end to an enlarged cylindrical head 44. This enlarged head 44 has a long, narrow opening 46 at its end above which is positioned the upper cylindrical portion 48. Several allen screw holding means 50 are located vertically through said upper cylindrical portion 48. The narrow opening 46 has a width which extends the whole diameter of the enlarged head and a depth sufficient enough to allow the holding of a tool bit parallel to the horizontal diameter of the enlarged head. At the opposite end from the positioning groove 52, the narrow opening 46 extends the entire depth of the enlarged head as shown at 54, so that a tool bit can be positioned perpendicular to the diameter of the enlarged head (see FIG. 2). This portion of the narrow opening corresponds to the slot 22 of the tool mount so that a tool bit can be placed as seen in FIGS. 1 and 2. A lock groove 52 is positioned adjacent the bottom of said narrow opening along the exterior side of the enlarged head 44. The purpose of the positioning groove 52 is to aid in properly aligning the tool mount with the tool holder and locking the two devices in that position. For example, when the tool holder is placed in the tool mount, the lock grooves 24 and 52 are matched forming a hole and a lock pin 100 is placed within the hole. The proper tool bit 90 is then in place along the center line automatically. It should be noted here that there should be a special sized head for each size tool. By this it is meant that for centering a ¼″ tool it must be placed in a ¼″ head and a ½″ tool must be placed in a ½″ head, etc. If a machinist is working with a ¼″ tool and desires to work with a ½″ tool, all that is required is to remove the entire tool holder and replace with another tool holder having a ½″ head holding a ½″ tool. By aligning the lock grooves 24 and 52, the tool bit is again set for work.

No other prior art tool mount and tool holder can accomplish as many different operations with as much precision and ease of operation as can be produced by applicant's new and inexpensive tool mount and holder.

I claim:

A combination tool holder and tool mount, said tool mount comprising a block, said block having an opening extending horizontally therethrough and positioned so that the axis of said opening lies in a horizontal plane, said block having a second opening in the same plane as and intersecting at right angles said first mentioned opening, a positioning groove on the circumference of one of said openings, said block having a horizontal slit extending between both of said openings, said tool holder comprising an elongated cylindrical portion positioned in one of said openings, an enlarged head provided at one end of said elongated cylindrical portion, said enlarged head provided with a tool holding horizontal slot, means securing a tool in said slot, a groove in said cylindrical portion aligned with said groove in said opening positioning said slot in a horizontal plane, lock plug means inserted in said grooves, and tightening means extending through said block to close the slit and thereby hold said tool holder in said tool mount.

References Cited in the file of this patent
UNITED STATES PATENTS

| | | |
|---|---|---|
| 2,324,603 | Strobl | July 20, 1943 |
| 2,848,918 | Lustrik | Aug. 26, 1958 |